(12) United States Patent
Feldtkeller (10) Patent No.: US 7,792,197 B2
(45) Date of Patent: *Sep. 7, 2010

(54) METHOD FOR TRANSMITTING DATA AND DATA TRANSMITTER

(75) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 700 days.

This patent is subject to a terminal disclaimer.

(21) Appl. No.: 11/731,022

(22) Filed: Mar. 29, 2007

(65) Prior Publication Data

US 2008/0031379 A1 Feb. 7, 2008

(30) Foreign Application Priority Data

Mar. 29, 2006 (DE) .................. 10 2006 014 640

(51) Int. Cl.
*H04B 3/00* (2006.01)
(52) U.S. Cl. ......................... 375/258; 375/257
(58) Field of Classification Search ......... 375/256–258, 375/260
See application file for complete search history.

(56) References Cited

U.S. PATENT DOCUMENTS

| | | | |
|---|---|---|---|
| 3,969,639 A | 7/1976 | Granberg et al. | |
| 4,027,152 A | 5/1977 | Brown et al. | |
| 6,043,619 A * | 3/2000 | Gleim | 318/400.2 |
| 6,262,600 B1 * | 7/2001 | Haigh et al. | 326/82 |
| 6,525,566 B2 * | 2/2003 | Haigh et al. | 326/82 |
| 6,614,848 B2 * | 9/2003 | Lohr | 375/257 |
| 6,950,567 B2 * | 9/2005 | Kline | 385/15 |
| 7,492,827 B2 * | 2/2009 | Feldtkeller | 375/258 |
| 2004/0005009 A1 | 1/2004 | Taghizadeh-Kaschani | |

FOREIGN PATENT DOCUMENTS

| | | |
|---|---|---|
| DE | 2555260 B2 | 3/1981 |
| DE | 10229860 A1 | 1/2004 |
| DE | 10244186 A1 | 4/2004 |
| EP | 1626546 A2 | 2/2006 |

* cited by examiner

*Primary Examiner*—Emmanuel Bayard
(74) *Attorney, Agent, or Firm*—Maginot, Moore Beck (57) ABSTRACT

A method is disclosed herein for transmitting data via a transmission path with at least two inductive transformers which respectively have a primary winding with a time constant and a secondary winding. The method comprises actuating the primary winding in order to transmit an information event by means of actuating signals such that the sum of the actuating signals follows an envelope with an envelope time. The envelope is chosen such that its time profile rises within a rise time from an initial value to a maximum value and falls within a fall time from the maximum value back to the initial value. The time profile of the actuating signals is dependent on the information to be transmitted and is chosen such that there is at least one steep edge present whose edge time is shorter than the time constants of the primary windings.

19 Claims, 7 Drawing Sheets

METHOD FOR TRANSMITTING DATA AND DATA TRANSMITTER

CROSS-REFERENCE TO RELATED APPLICATIONS

This application claims priority from German patent application number 10 2006 014 640.9-55, filed Mar. 29, 2006, the contents of which are incorporated herein by reference.

TECHNICAL FIELD

The present invention relates to a method and an apparatus for transmitting data via a data transmission path with inductive transformers, particularly with so-called coreless transformers.

BACKGROUND

Differential signal transmission methods are known in which edges of a signal to be transmitted are converted into signal pulses and in which these signal pulses are respectively repeated periodically in order to be able to identify and correct transmission errors caused by interfering influences. However, in this method a comparatively high power consumption arises as a result of the periodic repetition of the transmitted signal pulses.

In other methods, the time information about rising edges of a binary signal is transmitted in the form of pulses via a first transmission channel, and the information about falling edges of this signal is transmitted in the form of pulses via a second transmission channel. In these methods, both transmission channels are monitored for noise signal detection in order to retransmit the last useful signal pulse transmitted if a noise signal is detected.

SUMMARY

A method according to an exemplary embodiment of the invention involves transmitting data via a transmission path with at least two inductive transformers which respectively have a primary winding with a time constant and a secondary winding. The method comprises actuating the primary windings in order to transmit an information event by means of actuating signals such that the sum of the actuating signals follows an envelope with an envelope time. The envelope is chosen such that its time profile rises within a rise time from an initial value to a maximum value and falls within a fall time from the maximum value back to the initial value, with absolute values of the rise time and the fall time being longer than the constants of the primary windings. The time profile of the actuating signals is dependent on the information to be transmitted and is chosen such that there is at least one steep edge present whose edge time is shorter than the time constants of the primary windings. The steep edge of the actuating signal for one of the primary windings is produced after a magnetization time for this primary winding through partial off-commutation of this primary winding. This method step allows large signal swings for falling edges at a simultaneously low power supply for producing these actuating signals.

BRIEF DESCRIPTION OF THE DRAWINGS

In the figures, unless stated otherwise, identical reference symbols denote components and signals with the same meaning.

DETAILED DESCRIPTION

Figure 1:
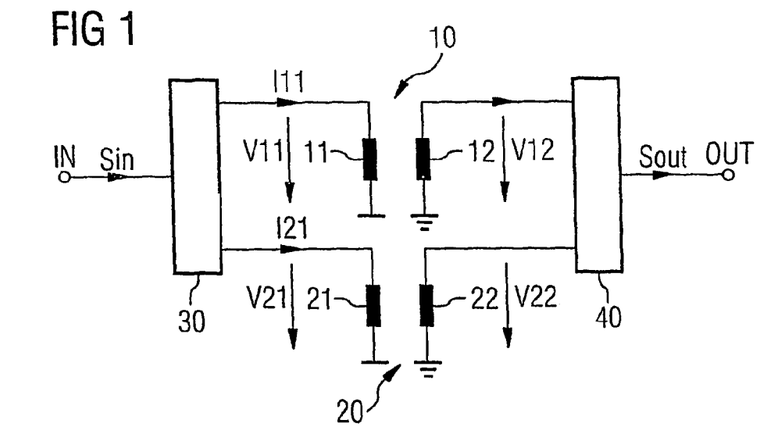
FIG. 1 shows a data transmission path with a transmitter and a receiver and also with a transmission path being arranged between the transmitter and the receiver apparatuses and having two transformers.

FIG. 1 shows an overview of a data transmitter with a transmitter 30, to which a transmitted signal Sin is supplied at an input IN, a receiver 40, which provides a received signal Sout at an output OUT, and with a transmission path arranged between the transmitter 30 and the receiver apparatus 40. The transmission path comprises two inductive transformers 10, 20 which respectively have a primary winding 11, 21 and a secondary winding 12, 22. In this arrangement, the primary windings 11, 21 are connected to the transmitter 30, and the secondary windings 12, 22, which are inductively coupled to the primary windings 11, 21, are connected to the receiver circuit 40. The primary windings 11, 21 are connected to a first or primary-side reference-ground potential by a connection which is remote from the transmitter 30, and the secondary windings 12, 22 are connected to a second or secondary-side reference-ground potential by a connection which is remote from the receiver circuit 40. In this context, these first and second or primary-side and secondary-side reference-ground potentials may be different.

For the following explanation, I11, I21 denote currents through the primary windings, and V11, V21 denote voltages across the primary windings 11, 21 which are produced by the transmitter 30 on the basis of the transmitted signal Sin which is to be transmitted via the channel. V12, V22 denote voltages across the secondary windings 12, 22 which, on account of the inductive coupling, result from the voltages V11, V21 present across the primary windings 11, 21 and the currents I11, I21 flowing through the primary windings.

Figure 2:
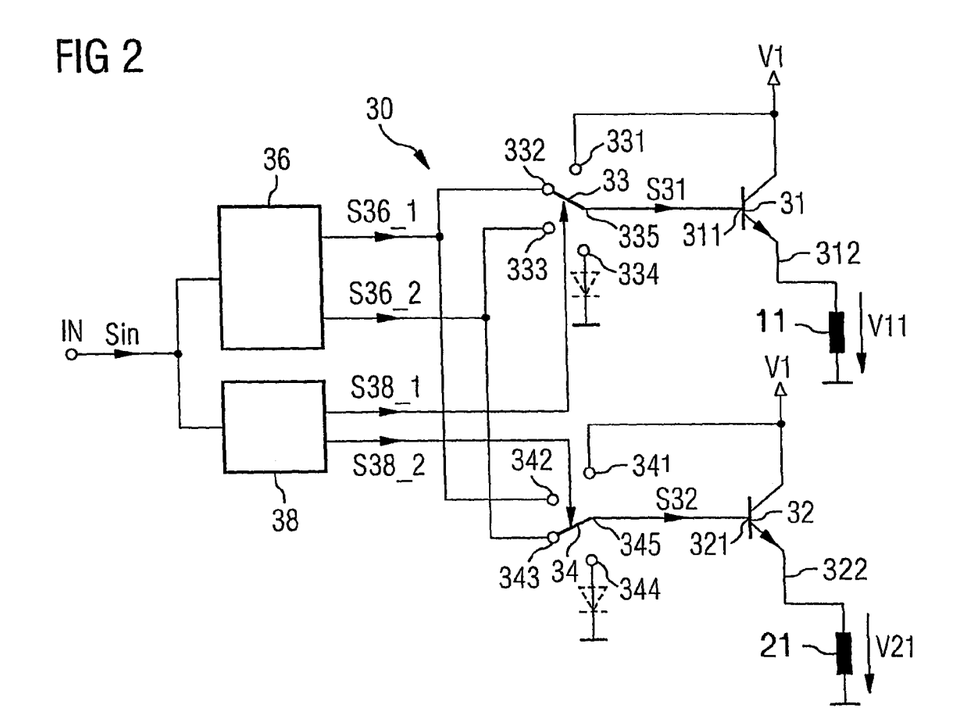
FIG. 2 shows an example of the transmitter, which has an envelope generator and, for each of the transformers, a transmitter-end driver circuit.

FIG. 2 shows an example of the transmitter 30. This transmitter has two driver circuits 31, 32, of which a first driver circuit 31 is connected to the first primary winding 11 and a second driver circuit is connected to the second primary winding 21. The two driver circuits respectively have a control input 311, 321 for supplying a control signal S31, S32 and an output 312, 322 for providing the actuating voltages V11, V21 for the primary windings 11, 21 as stipulated by the control signals S31, S32. The driver circuits produce the voltages across the primary windings 11, 21 in each case from a supply voltage V1 which is present between a node for supply potential and the primary-side reference-ground potential.

In the example, the two driver circuits 31, 32 respectively comprise a bipolar transistor whose base connection forms the control connection for the respective driver circuit 31, 32 and which is connected up as an emitter follower. In this arrangement, the emitter connections of the transistors form the outputs of the driver circuits 31, 32, to which the primary windings 11, 21 are connected. The collector-emitter paths of the transistors are in this case connected in series with the primary windings 11, 21 between the terminal for the supply potential V1 and the primary-side reference-ground potential. In this circuit, the actuating voltages V11, V21 follow the control signals S31, S32, which are voltages which take the primary-side reference-ground potential as a reference, and correspond, in terms of absolute value, to the control signals S31, S32 minus the threshold voltages of the transistors in the driver circuits 31, 32. The driver circuits 31, 32 are used to reduce the current loading for signal sources—yet to be explained—which provide the control signals S31, S32.

Connected upstream of the control inputs 311, 321 of the first and second driver circuits 31, 32 are first and second selection circuits 33, 34. Each of these selection circuits has an output 335, 345, which is connected to the input 311, 321 of the respective driver circuit 31, 32, and four inputs 331-334, 341-344. The selection circuits 33, 34 are designed to route a respective one of the signals applied to the inputs 331-334, 341-344 to the output 335, 345 as stipulated by a first and a second control signal S38_1, S38_2.

The selection signals S38_1, S38_2 are produced by a selection signal production circuit 38 on the basis of the transmitted signal Sin which is to be transmitted, as is yet to be explained.

The transmission circuit 30 also has an envelope generator 36 which is designed to produce a first a and second envelope signal S36_1, S36_2 as stipulated by the transmitted signal Sin. The envelope generator produces these envelope signals S36_1, S36_2 in each case for transmitting an information event. An example of such an event is a rising edge or a falling edge of the transmitted signal Sin.

Figure 3:
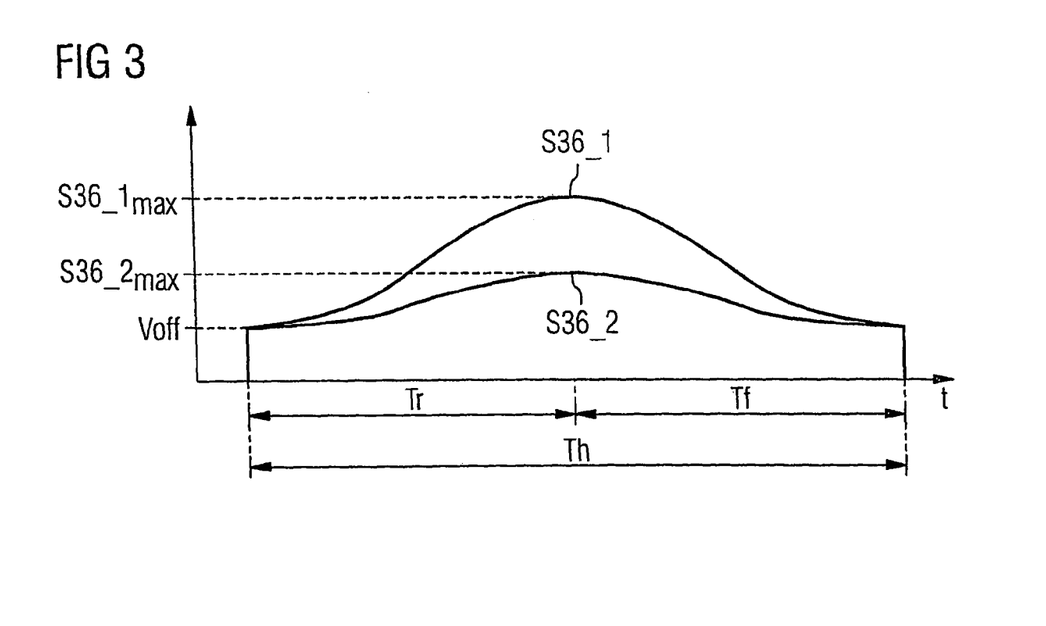
FIG. 3 shows examples of time profiles for the envelopes produced by the envelope generator.

FIG. 3 shows examples of time profiles for these two envelope signals S36_1, S36_2 which are produced for transmitting an information event. These two envelope signals S36_1, S36_2 respectively have an identical envelope time Th and are in a form such that they rise within a rise time Tr from an initial value to a maximum value $S36\_1_{max}$, $S36\_2_{max}$ and fall within a subsequent fall time Tf from the maximum value back to the initial value. In the example shown, the envelopes S36_1, S36_2 respectively start to fall back in the direction of the initial value directly after the maximum is reached.

The two envelopes S36_1, S36_2 shown differ in their maximum amplitude, with the first envelope S36_1 having a larger maximum amplitude than the second envelope S36_2 in the example.

In addition, the envelopes S36_1, S36_2 are chosen such that their gradient during the rise time Tr and during the fall time Tf is less in terms of absolute value than the quotient of the difference between the maximum value and the minimum value of the envelopes and the time constants of the primary windings 11, 21. This is synonymous with the rise time Tr and the fall time Tf of the envelope signals S36_1, S36_2 being greater than the time constants of the primary windings 11, 21. These time constants for the primary windings 11, 21 are known to correspond to the quotient of the inductance value and the resistance value of the primary windings 11, 21. It therefore holds that:

$$Tr > L/R \quad (1a)$$

$$Tf > L/R \quad (1b).$$

In this context, L denotes the inductance value of one of the two primary windings. R denotes the parasitic resistance value of one of these primary windings 11, 21.

These previously explained properties of the envelope signals S36_1, S36_2 relative to the time constants of the primary windings 11, 21 are synonymous with the statement that application of the envelope signals to the primary windings 21, 22 via the selection circuits 33, 34 and the driver circuits 31, 32 would not induce any significant voltages suitable for signal transmission in the secondary windings (12, 22 in FIG. 1) if one of the envelope signals were respectively applied to the primary windings via the driver circuits 31, 32 for its entire duration Th.

The two envelope signals shown in FIG. 3 encompass an offset Voff, i.e. their initial values at the start of the rise time Tr and their final values after the end of the fall time Tf are respectively not equal to zero, with the initial values and final values respectively being the same. By way of example, this offset Voff corresponds to the threshold voltage of the bipolar transistors 31, 32 used as driver circuits in the transmitter shown in FIG. 2.

One option for producing the two previously explained envelope signals S36_1, S36_2 is explained below with reference to FIG. 4, which shows a possible example of implementation of the envelope generator 36. This envelope generator 36 comprises a pulse generator 361 which is designed to produce a square-wave signal S361 of a prescribed duration T1 both after a rising edge and after a falling edge of the input signal Sin. This is explained in FIGS. 5A and 5B both for a rising edge and for a falling edge of the transmitted signal Sin. This duration T1 for the square-wave signals S361 corresponds to the rise time Tr of the envelope signals (S36_1, S36_2 in FIG. 3), for example.

Figure 5A:
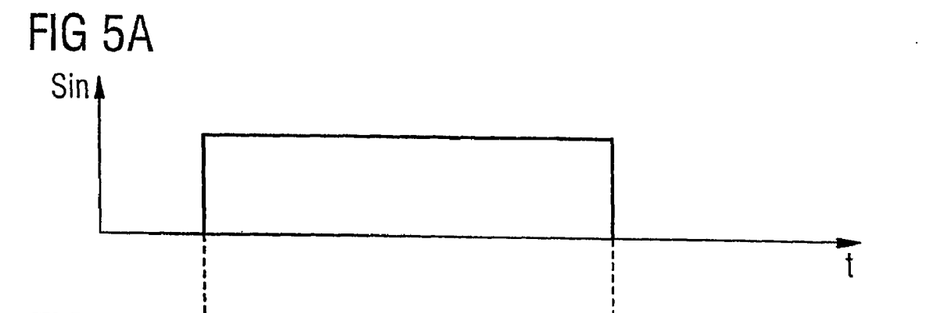
FIG. 5 shows examples of signals used for generating the envelopes.
Figure 5B:
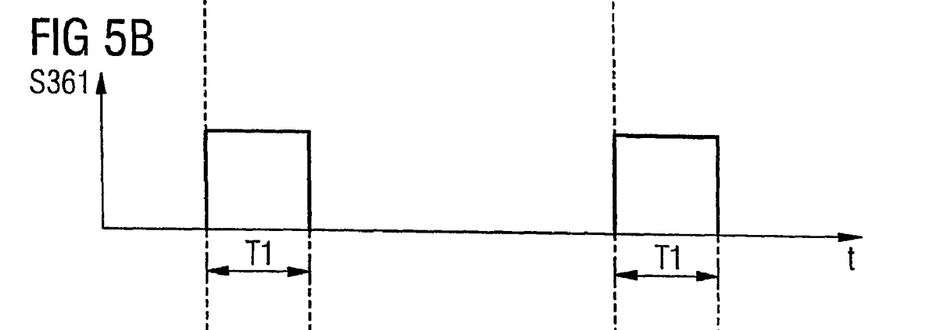
Figure 5C:
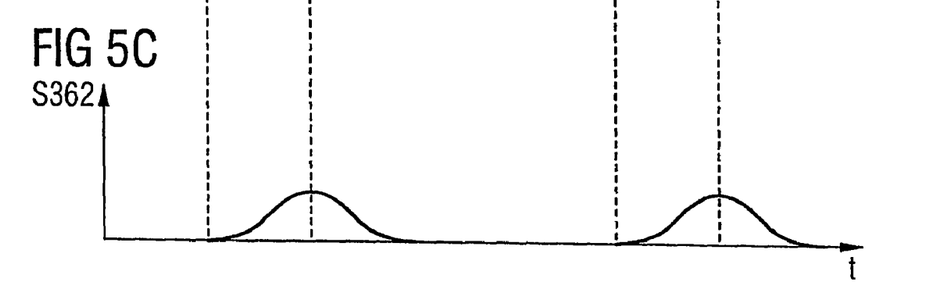

The pulse generator 361 has a pulse shaper 362 connected downstream of it which is supplied with the square-wave signal S361 and which is designed to produce an envelope signal S362 from the square-wave signal S361, as illustrated by FIG. 5c. By way of example, this pulse shaper is in the form of a higher-order low-pass filter, i.e. in the form of a low-pass filter with an order of greater than 1. The first and second envelope signals S36_1, S36_2 are produced by means of a voltage divider 364 from the envelope signal S36 available at the output of the pulse shaper 362, the larger S36_1 of the two envelope signals being able to correspond to the envelope signal S36 applied to the output of the pulse shaper 362. To produce envelope signals encompassing an offset, an offset voltage can be added to the two envelope signals S36_1, S36_2, this not being shown in more detail.

Figure 4:
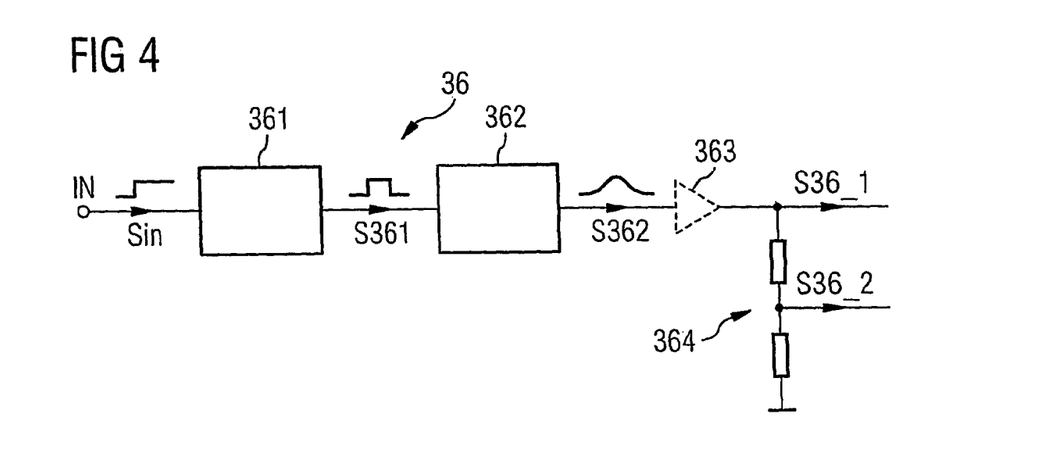
FIG. 4 schematically shows an example of an envelope generator.

In FIG. 4, the reference symbol 363 denotes an optionally provided driver circuit which is used to reduce the current loading for the envelope generator 36.

With reference to FIG. 2, the first inputs 331, 341 of the selection circuits 33, 34 are connected to the supply potential V i, the second inputs 332, 342 are respectively connected to the first output of the envelope generator 36 in order to supply the first envelope signal S36_1, the third inputs 333, 343 are respectively connected to the second output of the envelope generator 36 in order to supply the second envelope signal S36_2, and the fourth inputs 334, 344 are connected to the primary-side reference-ground potential.

As explained, the primary winding of the two transformers (10, 20 in FIG. 1), which are particularly in the form of air-core inductor transformers (coreless transformers), has a time constant which is governed by the cross section of the winding and by the coil diameter of the winding—which has a spiraled profile in the case of planar windings. This time constant is the quotient of the inductance and resistance of the primary winding. A voltage across the secondary winding decays with this time constant when a spasmodic excitation signal is applied to the primary winding. For data transmission via such a transformer, the primary windings 21, 22 need to have an actuating signal applied to them whose edges have rise times and fall times which are much shorter than these time constants. The production of such actuating signals or actuating voltages V11, V21, suitable for transmitting information, on the primary windings 21, 22 is explained in more detail below with reference to FIGS. 6 and 7.

Figure 6A:
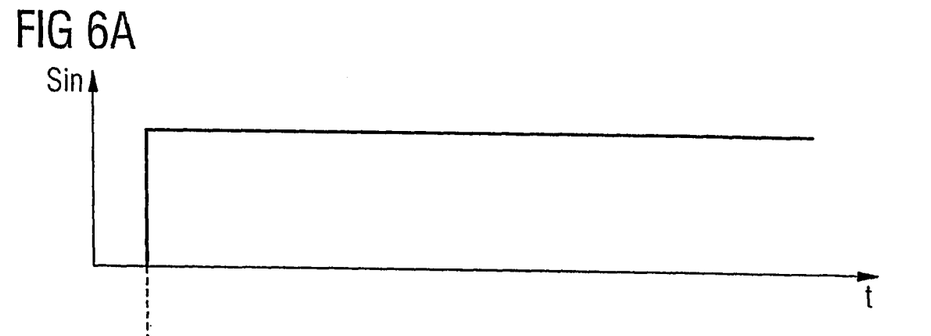
FIG. 6 shows examples of time profiles for the driver signals supplied to the driver circuits for transmitting an information event.
Figure 6B:
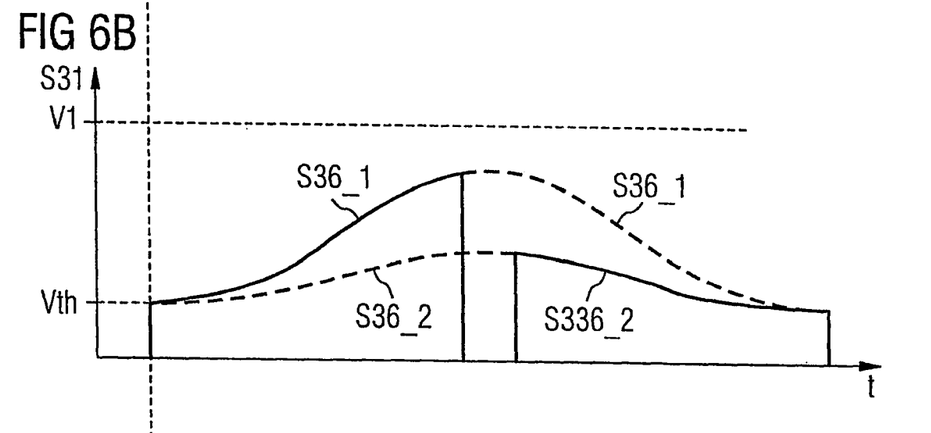
Figure 6C:
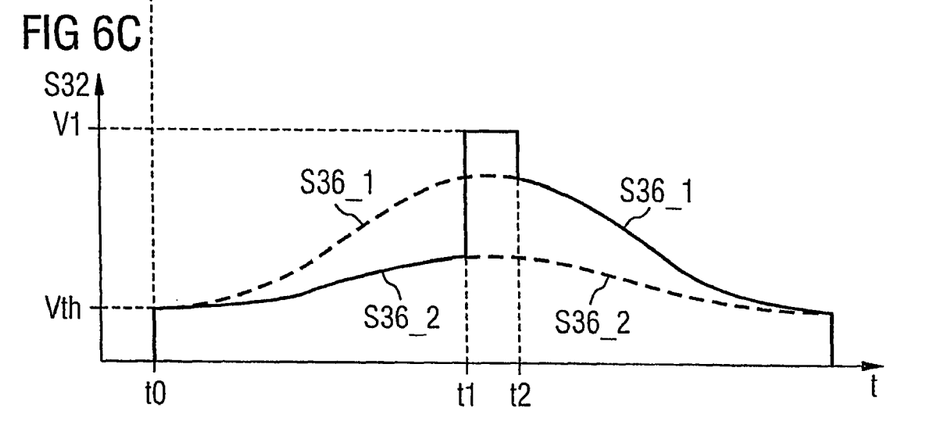
Figure 7A:
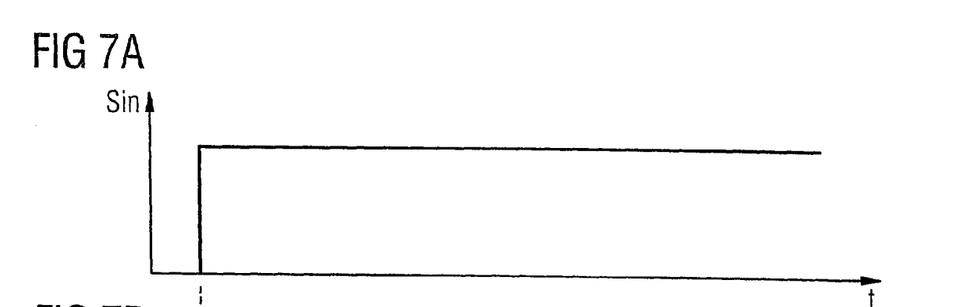
FIG. 7 shows time profiles for the actuating signals, which result from the driver signals, for primary windings of the transformers.
Figure 7B:
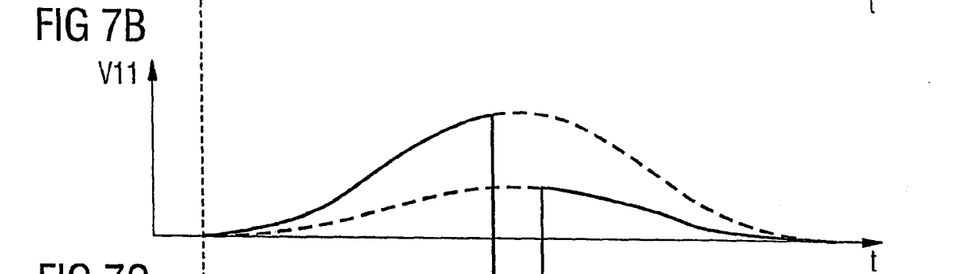
Figure 7C:
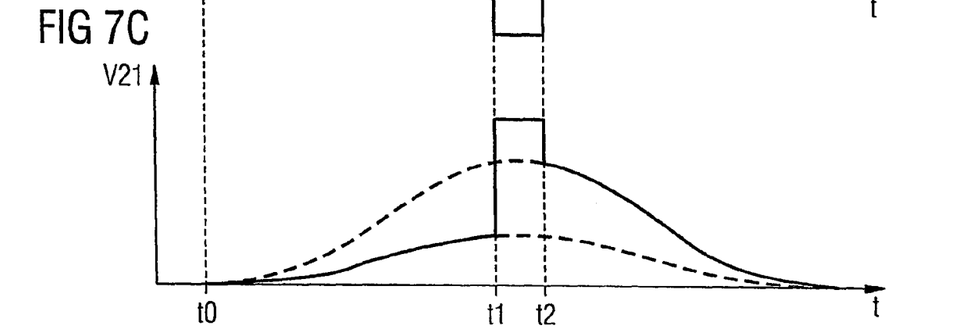
Figure 7D:
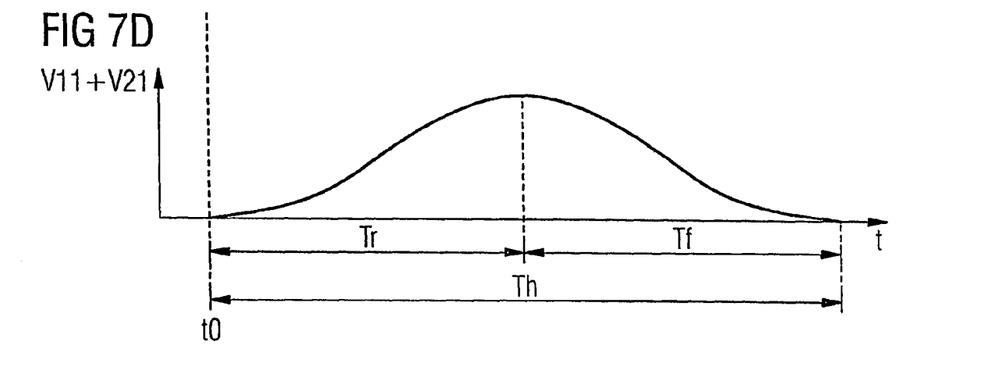

For the following explanation, an information event to be transmitted is a rising edge of the input signal Sin which is shown in FIGS. 6A and 7A. This rising edge occurs at an instant t0 in the example shown. FIGS. 6B and 6C show the time profiles for the control signals applied to the control inputs of the driver circuits. The primary windings' actuating voltages V11, V21 resulting from these control signals are shown in FIGS. 7B and 7C. The control signals S31, S32 and the actuating voltages V11, V21 are produced in three phases which are explained below.

During a first phase, whose timing directly follows the rising edge of the input signal Sin at instant t0, the first driver circuit 31 is supplied with the first envelope signal S36_1 via the first selection circuit 33, and the second driver circuit 32 is supplied with the second envelope signal S36_2 via the second selection circuit 34. During this first phase, the first actuating voltage V11 corresponds to the first envelope signal S36_1 minus the threshold voltage of the bipolar transistor in the first driver circuit 31, and the second actuating voltage V21 corresponds to the second envelope signal S36_2 minus the threshold voltage of the bipolar transistor in the second driver circuit 32. Since the gradients of these actuating voltages V11, V21 are small relative to the time constants of the primary windings 21, 22, no significant voltage is induced in the secondary windings 12, 22 of the transformers during this first phase.

A second phase starts at an instant t1, at which the control input 311 of the first driver circuit 31 is connected to the fourth input 334 of the first selection circuit 33 and hence to the primary-side reference-ground potential. The control input 321 of the second driver circuit 32 is connected to the first input 341 of the second driver circuit 32 at this instant t1 and hence to supply potential V1. The result of this process is a steep falling edge of the first control signal S31 at instant t1 and a steep rising edge of the second control signal S32 at this instant t1. The bipolar transistor in the first driver circuit 31 is off at instant t1, which means that a power supply for the first primary winding 21 by means of the first supply potential V1 is initially interrupted. During the second phase, the first primary winding 11, which is magnetized during the first phase, has a negative field voltage induced in it, which assumes negative values relative to the primary-side reference-ground potential. This negative field voltage is limited by the emitter-base threshold voltage of the bipolar transistor in the first driver circuit 31. At room temperature, this emitter-base threshold voltage usually has values between 0.7 V and 0.8 V, so that the voltage across the first primary winding 11 can assume values in the range of −0.7 . . . −0.8 V, in each case relative to the primary-side reference-ground potential. During this operating state, the emitter-base junction of this bipolar transistor in the first driver circuit 31 behaves like a diode via which the primary winding 21 is connected to the primary-side reference-ground potential by means of the fourth input 334 of the first selection circuit 33. On account of the current gain of the bipolar transistor, the principal component of the emitter current continues to flow via the collector and is taken from the supply potential V1.

In summary, the polarity of the voltage V11 across the first primary winding 11 changes at instant t1 while the direction of a current flowing through the primary winding (I11 in FIG. 1) remains the same. This is synonymous with the statement that the first primary winding 11 partially commutates off from instant t1 onward or that from this instant onward a portion of the magnetic energy previously stored in the primary winding 11 is removed. The reference-ground potential GND applied to the input of the first driver circuit 33 from instant t1 onward has the function of an off-commutation signal for the first primary winding 11, since when this reference-ground potential GND is applied to the first driver circuit 31, the first primary winding 11 (partially) commutates off.

A magnetization time, during which magnetic energy is stored in the primary winding before the partial off-commutation, corresponds to the period between instants t0 and t1.

Considered from a time perspective, the actuating voltage V11 across the first primary winding 11 can assume negative values until the magnetization of this primary winding 11 has been cleared.

A third phase of control signal production starts at an instant t2, at which the second envelope signal S36_2 is applied to the control connection 311 of the first driver circuit 31 via the first selection circuit 33, and the first envelope signal S36_1 is applied to the control input 321 of the second driver circuit 32 via the second selection circuit 34. From this instant onward, the first actuating voltage V11 follows the second envelope signal S36_2 minus the threshold voltage of the bipolar transistor in the first driver circuit 31, and the second actuating voltage V21 follows the first envelope signal S36_1 minus the threshold voltage of the bipolar transistor in the second driver circuit 32.

A period between the first and second instants t1, t2 is preferably short in comparison with the overall duration Th of the envelope signals and preferably short enough for the first primary winding 21 not to be demagnetized or not to commutate off completely during this period. The first actuating voltage V11 therefore remains at an approximately constant negative signal level during this period. The period between instants t1 and t2 is shorter than the L/R time constants of the primary windings 21, 22 in this case.

At the start of the second phase, the steep falling edge of the first actuating voltage V11 and the steep rising edge of the second actuating voltage V21 mean that the secondary windings 12, 22 have secondary voltages induced in them whose amplitudes are governed by the signal swing of the actuating voltages V11, V21. In the case of the method based on the invention, a large signal swing can be achieved even at a low supply potential V1 by intermittently, i.e. between instants t1 and t2, operating the first primary winding 21 such that the applied actuating voltage V11 assumes negative values relative to the primary-side reference-ground potential. This is achieved by virtue of the first primary winding 11 being actuated such that it can partially commutate off via a freewheeling element, in the example the emitter-base diode of the transistor 31, after initial magnetization during an off-commutation time which is determined by the period between instants t1 and t2.

In this case, the amplitude of the negative voltage across the primary winding during the off-commutation time is dependent on the forward voltage of the freewheeling element. This voltage could be increased further in the circuit shown in FIG.

2 by connecting a further diode between the control connection of the first driver circuit 31 and the terminal for the primary-side reference-ground potential, which is shown in dashes in FIG. 2.

The amplitudes of the envelope signals S36_1, S36_2 are preferably in tune with one another and with the supply potential V1 such that a signal swing in the falling edge of the first actuating voltage V11 at instant t1 corresponds to the signal swing in the rising edge of the second actuating voltage V21 at instant t1.

In this context, the signal swings in the edges arising at instant t2, i.e. in the rising edge of the first actuating voltage V11 and in the falling edge of the second actuating voltage V21, are smaller because from the second instant t2 onward the first actuating voltage V11 follows the smaller S36_2 of the two envelope signals and the second actuating voltage V21 follows the larger S36_1 of the two envelope signals.

Furthermore, the amplitudes of the envelope signals S36_1, S36_2 are in tune with one another and with the amplitude of the supply potential V1 such that between instants t1 and t2 the sum of the two envelope signals S36_1 and S36_2 corresponds to the level of the supply potential V1. The sum of the two actuating voltages V11, V21 then follows the summed envelope signal shown in FIG. 7D, which has an envelope time Th and which rises during a rise time Tr from an initial value to a maximum value and then falls from the maximum value to the initial value during a fall time Tf.

In the method explained above, signal transmission from the primary side to the secondary side of the transformers 10, 20 takes place during the envelope time Th at the respective instant t1 at the start of the second phase, at which the primary voltages V11, V21 have a steep falling edge and a steep rising edge. In this case, the gradient of these edges is large enough, in respect of the time constants of the primary windings 21, 22, to induce a significant voltage on the secondary side. The gradient of the rise in the first and second primary voltages V11, V21 before this instant t1 and the gradient of the fall in these primary voltages after instant t2 are too small, in respect of the time constants of the primary windings 21, 22, to induce a significant voltage on the secondary side.

The time interval between instants t1 and t2, and hence the off-commutation time, is preferably in tune with the time constants of the primary windings 21, 22 such that the signal swing at instant t2 means that voltage pulses are induced on the secondary side whose level respectively corresponds to the absolute value of the secondary voltages directly before instant t2, although these have their arithmetic sign reversed, so that at instant t2 the secondary voltages fall at least approximately to zero.

Figure 8A:
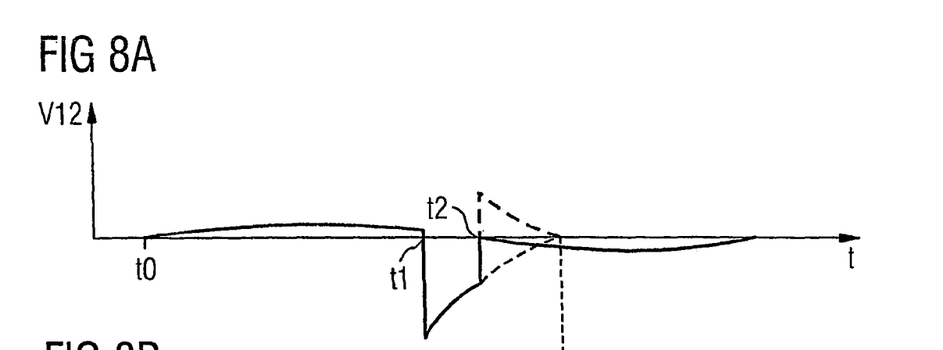
FIG. 8 illustrates time profiles for the secondary-side signals of the transformers, which result from the primary-side actuating signals.
Figure 8B:
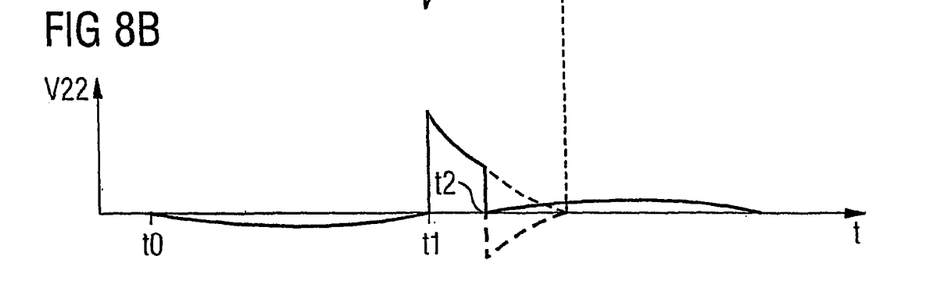

FIGS. 8A and 8B show the time profiles of the secondary voltages V12, V22 resulting from the primary voltages V11, V21 shown in FIGS. 7B and 7C. The sudden voltage changes across the primary windings 11, 21 at instant t1 result in abruptly rising and then exponentially falling signal profiles on the secondary side. In this case, the falling edge of the first primary voltage V11 results in a negative signal V12 on the first secondary winding 12, whose absolute value decreases from instant t1 onward as time progresses, while the rising edge of the second primary voltage V21 results in a positive signal whose absolute value decreases from instant t1 onward as time progresses. The signal profiles V12, V22 for the secondary windings 12, 22, with exponentially falling absolute values, are shown by solid lines from instant t1 onward and are shown by dotted lines from instant t2 onward.

From instant t2 onward, these signals exponentially falling from instant t1 onward are overlaid with abruptly rising and subsequently exponentially decreasing signals with a reversed arithmetic sign and with a smaller signal swing. These signals, whose profile is shown in dashes in FIG. 8, result from the sudden voltage or signal changes on the primary side at instant t2. At this instant t2, the first primary voltage V11 has a rising edge which results in an abruptly rising signal with positive amplitude on the secondary side, whose absolute value decreases exponentially as time progresses. The second primary voltage V21 has a falling edge at this instant t2, which results in an abruptly rising signal with negative amplitude on the secondary side, whose absolute value decreases exponentially as time progresses.

In this context, the time interval between t1 and t2 is in tune with the time constant of the primary windings such that the absolute value of the voltage induced on the secondary side on account of the sudden voltage change at instant t2 corresponds to that of the secondary-side voltage shortly before instant t2. The secondary-side signal components resulting from the primary-side sudden signal changes at instants t1 and t2 are then respectively overlaid to form a signal whose amplitude from instant t2 onward is approximately zero and which is shown in the form of a solid line in FIG. 8.

The advantage of the inventive method is that large signal swings in the actuating voltages V11, V21 can be achieved at a low supply voltage V1 and that the sum of the currents through the primary windings, which essentially determine the current drawn by the transmitter 30, follows the envelope. The same applies to the sum of the magnetic fields resulting from actuation of the two primary coils 21, 22. The outward effect is governed by the magnetic field which results from the total current drawn by the transmitter and which likewise follows the envelope, since the total current, i.e. the sum of the primary currents I11, I21 (in FIG. 1), follows the envelope. Electromagnetic interfering radiation arising in the case of the inventive method is therefore dependent exclusively on the time profile of the envelope, whose rising and falling edges can be chosen entirely independently of the time constant of the primary windings and which can therefore be optimized in order to reduce electromagnetic interfering radiation. The two envelope signals S36_1, S36_2 are preferably chosen such that they approximately follow a Gaussian curve within the envelope time Th. The same applies accordingly to the sum of the actuating voltages V11, V21. It goes without saying that any other curve profiles optimized for electromagnetic interfering radiation can be used for the envelope signals S36_1, S36 -2. Another example is a time profile for the envelope signals S36_1, S36_2 based on a raised cosine pulse, which is sufficiently well known in data transmission. Instant t1, at which the second phase of production of the control signals S31, S32 starts, is preferably chosen such that it is situated on or after the maximum of the envelope signals S36_1, S36_2.

In the example shown, the actuating voltages V11, V21 on the primary windings 11, 21 are heavily dependent on the supply potential V1. Accordingly, the amplitudes of the voltage pulses brought about on the secondary side at instant t1 and the current drawn by the arrangement are also dependent on this supply potential V1. To be able to use the transmitter 30 which has been explained over a wide range of supply voltages, the supply potential V1 is preferably derived from a given supply voltage (not shown) using a voltage regulator with a low saturation voltage. The envelope signals S36_1, S36_2 can also be derived from this stabilized voltage.

It should be pointed out that the collector connections of the drivers 31, 32 are not necessarily supplied from the regulated supply potential V1. The drivers 31, 32 can also be supplied from an unregulated supply voltage. Advantageously, however, the inputs of the selection circuit 331 and 341 are connected to a regulated supply potential, and the envelope signals are derived from a regulated supply potential.

The inventive transmission method has been explained using FIGS. 5 and 6 for the transmission of an information event, represented by a rising edge of the input signal Sin. A second information event, which is represented by a falling edge of the input signal Sin, is transmitted by complementary actuating signals, i.e. the control signal (S31 in FIG. 6) which is applied to the first driver circuit 31 in order to transmit a rising edge is applied to the second driver circuit 32 in order to transmit a falling edge, and the control signal (S32 in FIG. 6) which is applied to the second driver circuit 32 in order to transmit a rising edge is applied to the first driver circuit 31 in order to transmit a falling edge.

In the method illustrated above, the edges of the input signal Sin are transmitted with a time delay, because after an edge of the input signal Sin the period between instants t0 and t1 is waited for until correspondingly steep edges of the primary voltages V11, V21 are produced.

Figure 9:
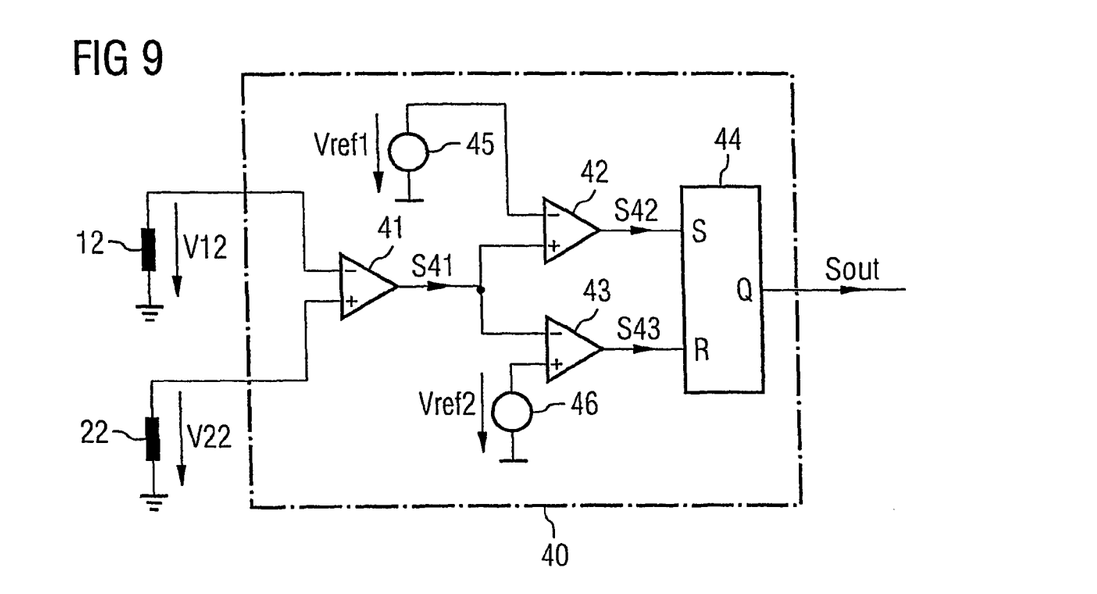
FIG. 9 schematically shows a first example of implementation of the receiver circuit.

A possible receiver circuit 40 for processing the voltages V12, V22 produced on the secondary side and for producing a received signal Sout which is dependent on the transmitted signal Sin is shown in FIG. 9.

The receiver circuit 40 has a differential amplifier 41 whose inverting input is supplied with the first secondary voltage V12 and whose non-inverting input is supplied with the second secondary voltage V22. At the output of this differential amplifier 41 there is a differential signal S41 available which corresponds to the (amplified) difference between the second secondary voltage V22 and the first secondary voltage V12. The differential amplifier 41 has a comparator arrangement connected downstream of it with a first and a second comparator 42, 43. The first comparator 42 compares the differential signal S41 with a first threshold voltage Vref1 provided by a first reference voltage source 45, and the second comparator 43 compares the differential signal S41 with a second threshold voltage Vref2 provided by a second reference voltage source 46. The first comparator 42 is connected up to the differential amplifier 41 and to the first reference voltage source 45 such that the output of this first comparator produces a High level in the example when the differential signal S41 exceeds the first threshold value Vref1. The second comparator 43 is connected up to the reference voltage source 46 and to the differential amplifier 41 such that the output of this comparator 43 produces a High level when the differential signal S41 drops below the level of the second threshold value Vref2. The two comparators 42, 43 have a memory circuit connected downstream of them which is supplied with the output signals S42, S43 from the two comparators 42, 43. In the example, the memory circuit 44 is in the form of an RS-type flipflop whose Set input is supplied with the first comparator signal S42 and whose Reset input is supplied with the second comparator signal S43. The output of this flipflop 44 provides the received signal Sout, which follows the input signal Sin after a time delay in the case of correct transmission. The flipflop 44 is set at instant t1 upon a positive pulse of the differential signal S41, as a result of which the received signal Sout assumes a High level, and the flipflop is reset at instant t3 upon a negative pulse of the differential signal S41, as a result of which the output signal Sout assumes a Low level.

The threshold values Vref1, Vref2 in this receiver circuit are in tune with the amplitudes of the secondary voltages V12, V22 such that between instants t1 and t2 the output signal S41 from the differential amplifier is certain to reach the thresholds Vref1 and Vref2 and that the secondary voltages induced during the rise and fall times of the envelopes are certain not to result in the thresholds Vref1 and Vref2 being reached before instant t1 and after instant t2.

Figure 10:
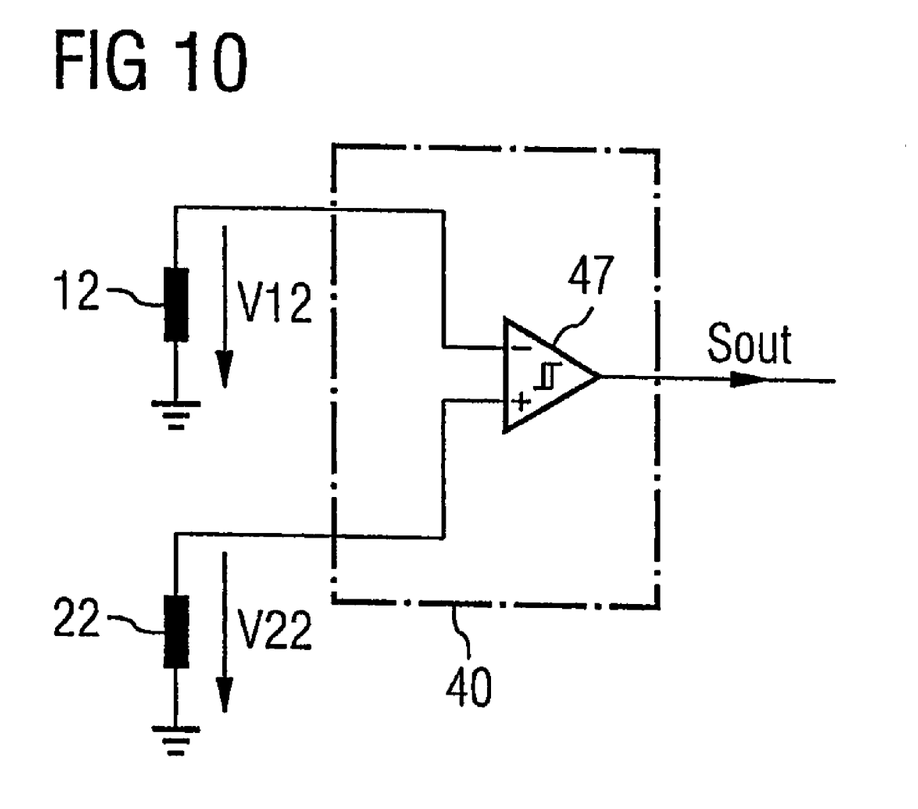
FIG. 10 schematically shows a second example of implementation of the receiver circuit.

Another exemplary embodiment of a receiver circuit 40 is shown in FIG. 10. This receiver circuit has a comparator with hysteresis which is supplied with the secondary voltages V12, V22 and which produces the output signal Sout. In this case, the switching thresholds for the hysteresis are symmetrical with respect to one another and are chosen such that a voltage difference between the secondary voltages V12, V22 results in one of the thresholds being exceeded/undershot between instants t1 and t2 and that the thresholds are not reached before instant t1 and after instant t2.

While the invention disclosed herein has been described in terms of several preferred embodiments, there are numerous alterations, permutations, and equivalents which fall within the scope of this invention. It should also be noted that there are various alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for transmitting data via a transmission path with at least two inductive transformers which each respectively include a primary winding with a time constant and a secondary winding, the method comprising:
   actuating the primary windings to transmit an information event using actuating signals such that the sum of the actuating signals follows an envelope with an envelope time;
   wherein the envelope includes a time profile that rises within a rise time from an initial value to a maximum value and falls within a fall time from the maximum value back to the initial value, and the rise time and the fall time are longer in terms of absolute value than the time constants of the primary windings;
   wherein the time profile of the actuating signals is dependent on information to be transmitted and is such that there is at least one steep edge present whose edge time is shorter than the time constants of the primary windings; and
   producing the steep edge of the actuating signal for one of the primary windings after a magnetization time for the one of the primary windings through partial off-commutation of the one of the primary windings during an off-commutation time.

2. The method as claimed in claim 1, further comprising producing the steep edge of the actuating signal for the other of the primary windings by connecting the other of the primary windings to a constant supply potential for the off-commutation time.

3. The method as claimed in claim 1, wherein the envelope comprises first and second envelope signals, and wherein the actuating signals are dependent on the envelope signals during the magnetization time and after the off-commutation time.

4. The method as claimed in claim 1, wherein the envelope comprises first and second envelope signals,
   wherein during the magnetization time the actuating signal for one of the first and second primary windings is dependent on one of the first and second envelope signals, and the actuating signal for the other of the first and second primary windings is dependent on the other of the first and second envelope signals, and
   wherein after the off-commutation time the actuating signal for the one of the first and second primary windings is dependent on the other of the first and second envelope signals, and the actuating signal for the other of the first and second primary windings is dependent on the one of the first and second envelope signals.

5. The method as claimed in claim 4, wherein -the first envelope signal has a larger signal swing than the second envelope signal, and wherein the actuating signal for the primary winding, whose power supply is interrupted during the off-commutation time, is dependent on the first envelope signal during the magnetization time.

6. The method as claimed in claim 5, wherein time profiles of the actuating signals are such that there is a steep edge directly after, or an insubstantial time after, an instant at which the envelope signals reach their maximum value.

7. The method as claimed in claim 4, wherein time profiles of the actuating signals are such that there is a steep edge directly after, or an insubstantial time after, an instant at which the envelope signals reach their maximum value.

8. The method as claimed in claim 3, wherein time profiles of the actuating signals are such that there is a steep edge directly after, or an insubstantial time after, an instant at which the envelope signals reach their maximum value.

9. The method of claim 1 wherein the off-commutation time is between 2% and 15% of the envelope time.

10. The method of claim 3 wherein the envelope signals have the profile of a Gaussian curve or the profile of a section of a sine-squared curve.

11. The method of claim 1 further comprising the step of ascertaining the transmitted information event at a receiver end, the step of ascertaining including,
   detecting received signals tapped off from the secondary windings;
   forming a differential signal from the received signals; and
   comparing the differential signal with a first and a second threshold value.

12. An apparatus for transmitting data, the apparatus comprising:
   a transmission path with at least two inductive transformers, each of the two inductive transformers including a primary winding with a time constant and a secondary winding;
   a transmitter connected to the primary windings, the transmitter including an input for supplying a transmitted signal, the transmitter providing actuating signals for the primary windings such that the sum of the actuating signals follows an envelope with an envelope time;
   wherein the envelope defines a time profile that rises within a rise time from an initial value to a maximum value and falls within a fall time back to the initial value, wherein the rise time and the fall time are longer in terms of absolute value than the time constants of the primary windings;
   wherein the time profile of the actuating signals is dependent on information to be transmitted and is such that there is at least one steep edge present whose edge time is shorter in terms of absolute value than the time constants of the primary windings; and
   wherein the steep edge of the actuating signal for one of the primary windings is produced after a magnetization time for the one of the primary windings through partial off-commutation of the one of the primary windings.

13. The apparatus of claim 12, further comprising a first driver stage connected to a first of the primary windings, and a second driver stage connected to a second of the primary windings.

14. The apparatus of claim 13 further comprising a signal generator configured to take an input signal as a basis for producing a first and a second envelope signal whose respective time profile rises within the rise time from the initial value to the maximum value and falls within the fall time back to the initial value and whose rise time and fall time are longer in terms of absolute value than the time constants of the primary windings.

15. The apparatus of claim 14 further comprising selection circuits, each of the selection circuits designed to supply the first or second envelope signal, an off-commutation signal or a constant upper actuating signal to one of the driver circuits as stipulated by a selection signal.

16. The apparatus of claim 15 wherein the signal generator comprises a pulse generator and a pulse shaper connected downstream of the pulse generator.

17. The apparatus as claimed in claim 12 further comprising a receiver circuit.

18. The apparatus of claim 17 wherein the receiver circuit comprises a differential amplifier with a first input connected to one of the secondary windings and a second input connected to the other of secondary windings, the differential amplifier configured to produce a differential signal.

19. The apparatus of claim 18 wherein the receiver circuit further comprises a comparator arrangement connected downstream of the differential amplifier and configured to compare the differential signal with a first and a second threshold value.

* * * * *